United States Patent
Distante et al.

(10) Patent No.: US 9,846,562 B2
(45) Date of Patent: Dec. 19, 2017

(54) METHOD AND SYSTEM FOR MONITORING THE DISPLAYING OF VIDEO CONTENTS

(71) Applicant: TAGGALO, S.R.L., Cavallino (Lecce) (IT)

(72) Inventors: Cosimo Distante, Cavallino (IT); Pierluigi Carcagni', Cavallino (IT); Luca Nestola, Cavallino (IT)

(73) Assignee: TAGGALO, S.R.L., Cavallino (Lecce) (IT)

( * ) Notice: Subject to any disclaimer, the term of this patent is extended or adjusted under 35 U.S.C. 154(b) by 77 days.

(21) Appl. No.: 14/651,353

(22) PCT Filed: Dec. 11, 2012

(86) PCT No.: PCT/IT2012/000377
§ 371 (c)(1),
(2) Date: Jun. 11, 2015

(87) PCT Pub. No.: WO2014/091505
PCT Pub. Date: Jun. 19, 2014

(65) Prior Publication Data
US 2015/0331653 A1    Nov. 19, 2015

(51) Int. Cl.
*G06K 9/00* (2006.01)
*G06F 3/14* (2006.01)

(52) U.S. Cl.
CPC .......... *G06F 3/1415* (2013.01); *G06F 3/1462* (2013.01)

(58) Field of Classification Search
CPC ................. G06F 3/1415; G06F 3/1462

USPC ........................................... 382/190
See application file for complete search history.

(56) References Cited

U.S. PATENT DOCUMENTS

2007/0201746 A1*  8/2007  Kim ............... H04N 5/147
                                                382/190
2011/0096246 A1*  4/2011  Dunn .............. G09G 3/006
                                                348/739

FOREIGN PATENT DOCUMENTS

| EP | 2200344 A2 | 6/2010 |
| EP | 2336966 A1 | 6/2011 |
| WO | 2006123089 A2 | 11/2006 |

OTHER PUBLICATIONS

Anonymous: "Options for Microvision test equipment", microvision, May 23, 2008 (May 23, 2008), XP002714499, Retrieved from the Internet: URL:http://www.microvsn.com/options.htm [retrieved on Oct. 8, 2013].

(Continued)

*Primary Examiner* — Amandeep Saini
(74) *Attorney, Agent, or Firm* — Thomas Horstemeyer, LLP

(57) ABSTRACT

A method (100) for monitoring the displaying of a plurality of video contents (VD1, . . . , VDM) on a display (1) is described, the video contents (VD1,, VDM) each comprising a stream of digital images (I1, . . . , IK), each digital image comprising a respective pixel matrix. The method does not require the integration of markers inside the video contents and the monitoring is performed by means of an optical sensor (2) having a sensitive area facing the display (1) so as to detect over time the chromatic variations of the video contents displayed.

19 Claims, 3 Drawing Sheets

(56) References Cited

OTHER PUBLICATIONS

Figure 1:
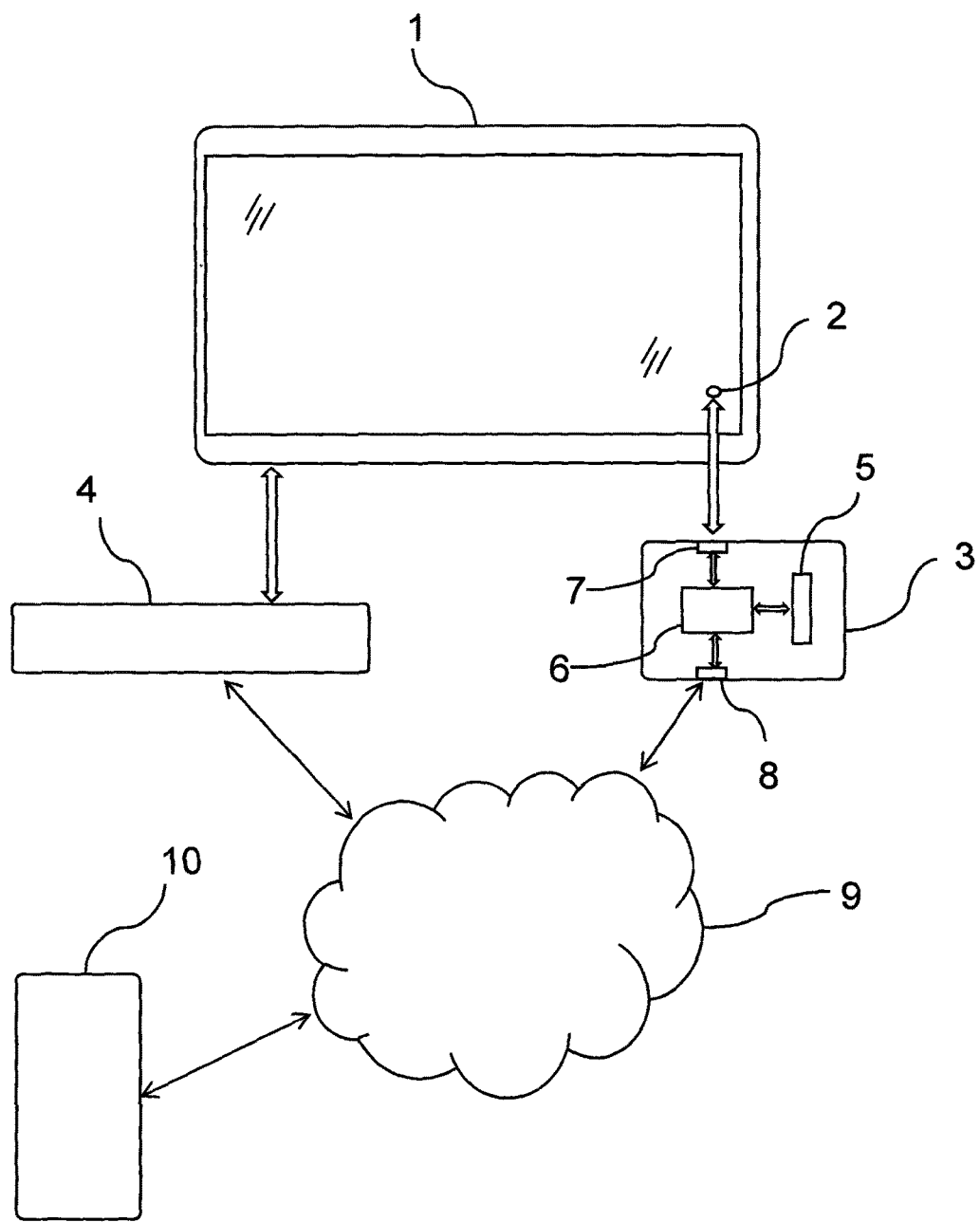

Najundaswamy HR, Divya BS: "Configurable VESA—VGA and DVI Test Pattern Generator", Design and Reuse , Jan. 8, 2011 (Jan. 8, 2011), XP002714500, Retrieved from the Internet: URL:http://www.design-reuse.com/articles/25249/vga-dvi-test-pattern-generator.html [retrieved on Oct. 8, 2013].
International Search Report for PCT/IT2012/000377 dated Nov. 20, 2013.

* cited by examiner

METHOD AND SYSTEM FOR MONITORING THE DISPLAYING OF VIDEO CONTENTS

CROSS-REFERENCE TO RELATED APPLICATION

This application is the 35 U.S.C. §371 national stage application of PCT Application No. PCT/IT2012/000377, filed Dec. 11, 2012, which herein is incorporated by reference in its entirety.

The present invention relates to the technical field of digital signage and in particular, relates to a method and system for monitoring the displaying of video contents on a display.

The need is felt to verify the correct displaying of video contents, or in general of multimedia contents, on a display. For example, such need is particularly felt in DOOH networks (Digital Out Of Home), by means of which thousands of advertisements are displayed daily in public places such as airports, railway stations and shopping centres. It is certainly of interest to clients, as also to the operators of public services, to know if their advertising videos have been displayed correctly according to predefined schedules, given that this type of advertising involves economic investments. It may in fact happen that on account of problems or failure of the hardware and/or software, the displaying of the video content, despite having been correctly scheduled, does not take place.

The prior art has a number of solutions permitting the aforesaid monitoring to be performed, which in the specific technical sector is usually called "proof of display". Examples of monitoring methods and systems are already described in the European patent application EP 2 336 966, in the European patent application EP 2 200 344 and in the international patent application PCT WO 2006/123089.

The aforesaid monitoring systems and methods of the prior art require the addition, inside the video contents, or in general of the multimedia contents to be displayed, of special markers also called "watermarks". From some points of view this is a drawback. In fact, the aforesaid monitoring systems and methods of the prior art require the producer to integrate, during the production phase, specific watermarks within the advertising contents to be displayed.

The need is therefore felt to make available a monitoring system and method which does not have the drawback described above with reference to the prior art The present description sets out to make available a monitoring method and system which permits the aforesaid need to be satisfied.

The aforesaid objective is achieved by means of a monitoring method as defined in general in the appended first claim in its most general form and in the dependent claims in some of its particular embodiments. A further purpose of the present invention is to make available a monitoring system as defined in the appended claim 14.

Figure 2:
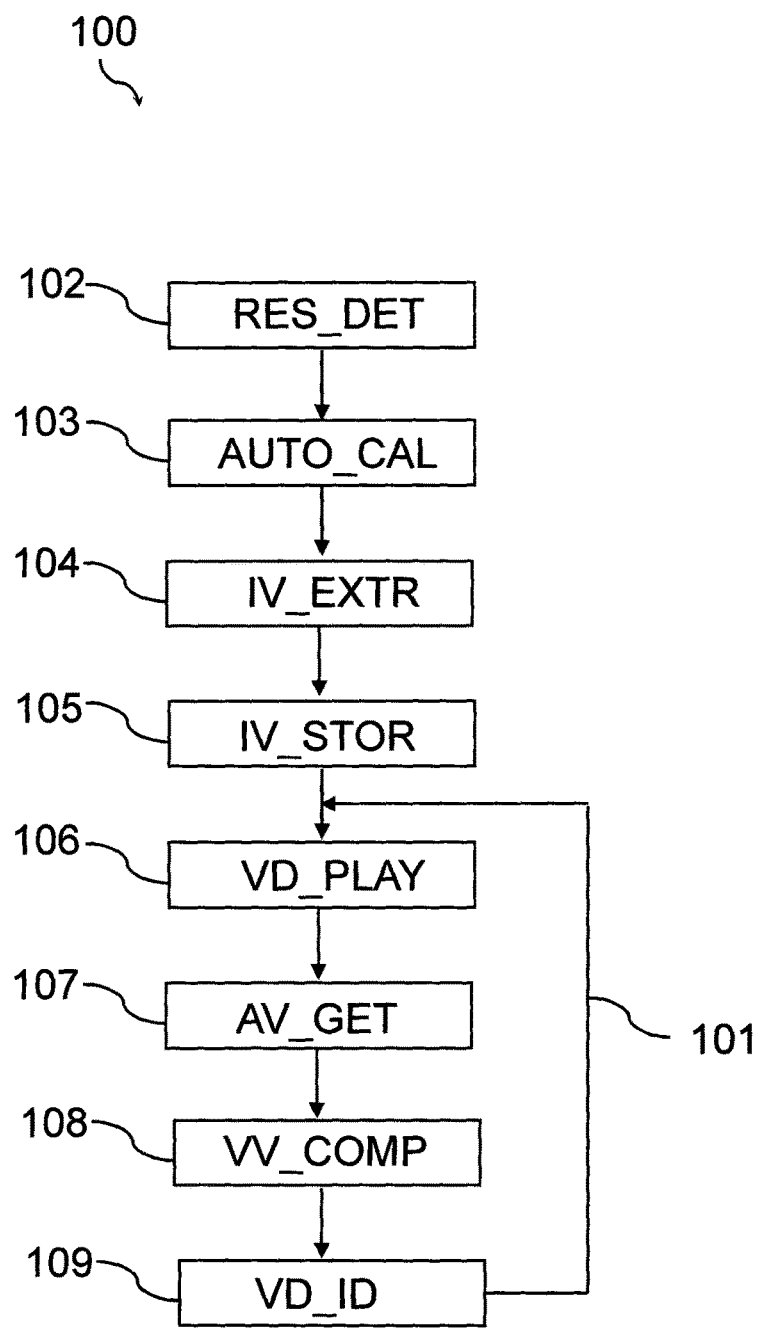
Figure 3:
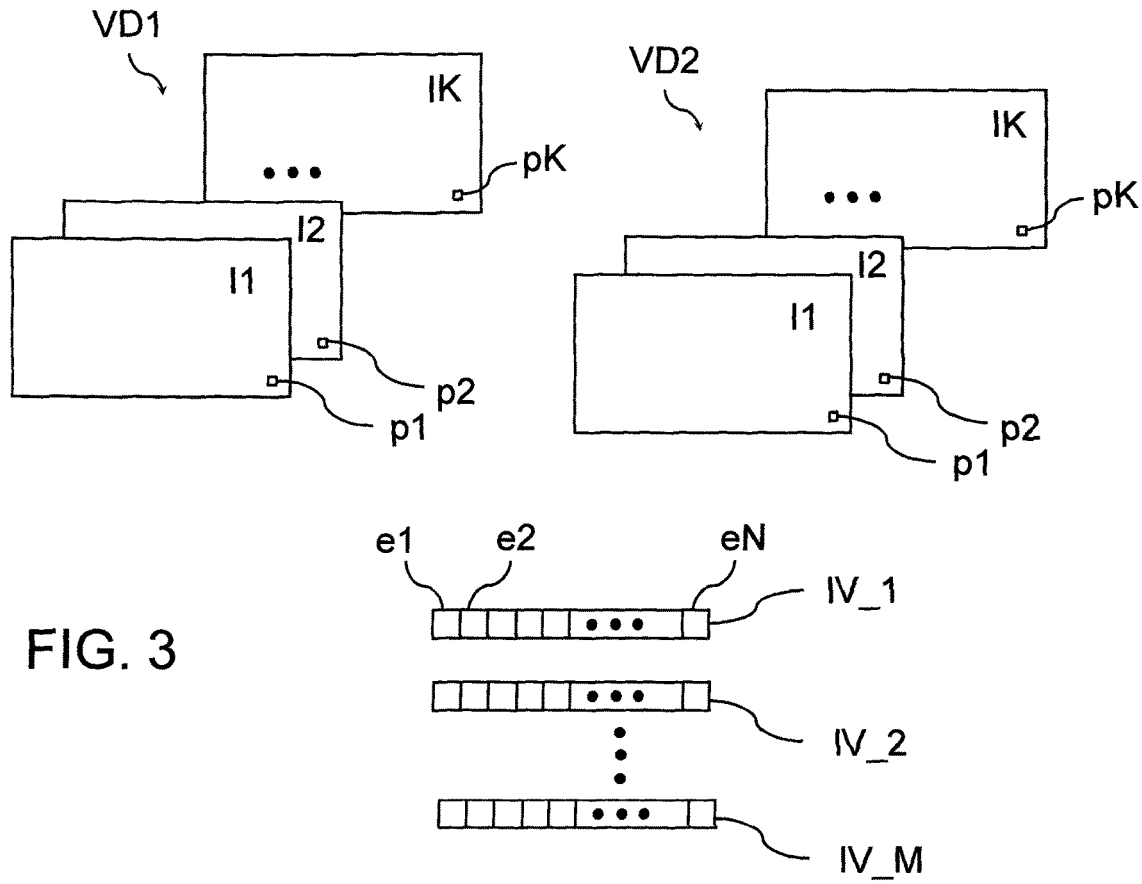
Figure 4:
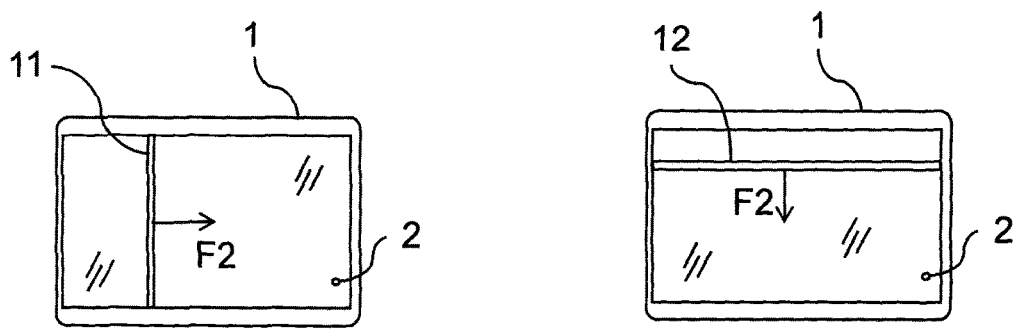

The invention will be more clearly comprehensible from the following detailed description of its embodiments made by way of non-limiting examples with reference to the appended drawings, wherein:

FIG. 1 schematically shows a display and a monitoring system comprising an optical sensor applied to the display;

FIG. 2 shows a stream diagram of a method for monitoring the displaying of video contents on the display in FIG. 1;

FIG. 3 schematically shows some data structures involved in the operation of the monitoring system in FIG. 1 and the monitoring method in FIG. 2; and FIG. 4 schematically shows two images displayed in the display 1 during a calibration step which may be envisaged if needed in the monitoring method in FIG. 2.

In the drawings, elements which are the same or similar will be indicated using the same reference numerals.

With reference to FIG. 1, a display 1 is shown, for example an LED or LCD display, predisposed for the displaying of a plurality of video contents, or in general multimedia contents.

A monitoring system 2, 3 is operatively coupled to the display 1 for monitoring the displaying on the display 1 of the video contents, comprising an optical sensor 2, operatively connected, by wire or radio to an acquisition and processing unit 3.

The acquisition and processing unit 3 comprises a first communication interface 7 to be operatively connected to the optical sensor 2 and comprises preferably a second communication interface 8 to be connected to a telecommunication network 9, for example for connection to the Internet. The acquisition and processing unit 3 comprises at least one data processing device 6, such as for example a processor and/or a DSP and/or a FPGA, and at least one memory unit 5.

The optical sensor 2, is for example a miniaturised semi-conductor photo-sensor, for example a colour sensor, and is attached to the front face of the display 1 so that the photosensitive area of the optical sensor 2 is facing an active area of the display 1. The optical sensor 2 is attached to the display 1 in such a way as to maintain a fixed position thereto during operation. The optical sensor 2 is for example applied/glued onto the active area of the display 1. The optical sensor 2 has much smaller dimensions than the active area of the display 1, so as to interfere only minimally with the viewing of the video contents by the public. According to one embodiment, the optical sensor 2 has a sensitive area of much smaller dimensions than the active area of the display, for example, the sensitive area has an extension of 2-6 mm2 so as to cover an area of few pixels of the active area of the display 1. According to one embodiment, the spatial resolution of the sensitive area of the optical sensor 2 is much greater than the spatial resolution of the display 1.

According to a preferred and non-limiting embodiment, the video contents include information of an advertising nature. The display 1 is for example designed to be installed in a public place for viewing of the video contents by a large number of people. The video contents V1, . . . , VDM, two of which are schematically shown in FIG. 3, each comprise a stream of digital images I1, . . . , IK. Each digital image I1, . . . , IK comprises a respective matrix of pixels. According to one embodiment, one may assume that the video contents V1, . . . , VDM which are to be displayed are M where M represents an integer of a desired size and greater than 1. One may also assume that each video comprises a stream of digital images K in sequence, wherein K represents an integer of a desired size and greater than 1.

With reference to FIG. 1, in the example represented therein, the display 1 is operatively coupled to a control unit 4 adapted to control the display 1 so that the video contents V1, . . . , VDM are displayed thereon. For example, if the video contents V1, . . . , VDM are memorised as files, the aforementioned control unit 4 is a unit, comprising hardware and software components, provided with a player suitable for playing such files and for controlling the display 1 in such a way that the video contents are shown on the display 1. In an alternative embodiment the aforementioned control unit 4 could be integrated in the display 1 instead of being an external device.

According to one embodiment, the control unit 4 includes a memory unit suitable for locally memorising the files corresponding to the video contents V1, ..., VDM. Such files may be updated for example by providing in the control unit 4 a connection to a network 9, for example Internet, by means of which the control unit 4 can be connected to a remote server 10 operated by the operator providing and operating the advertising service. It is evident that the server 10 may enable the operator to manage as large a number of displays 1 as desired.

According to a further embodiment, the control unit and acquisition and processing unit 3 are integrated with each other and for example are integrated in the display 1 or form a separate device. Independently of this, it is possible to envisage that the acquisition and processing unit 3 may also be operatively connected to the server 10 for example, but not exclusively, for sending the operator the results of the monitoring. In one embodiment variation, the acquisition and processing unit 3 could be distributed over two units, of which one responsible for the acquisition and positioned next to the optical sensor 2 and the other for processing positioned remotely at the server 10.

With reference to FIGS. 1-3, the various steps of possible embodiments of the monitoring method 100 will be described below.

The monitoring method 100 permits monitoring of the displaying of the plurality of video contents VD1, ..., VDM on the display 1.

The monitoring method 100 comprises a step of extracting 104 (IV EXTR) from each video content a respective vector $IV\_1, \ldots, IV\_M$ having a number N of elements $e1, \ldots, eN$. In the example described, the number of vectors extracted in the extracting step 104 is equal to M, in other words the extraction of a vector $IV\_1, \ldots, IV\_M$ for each video content to be displayed VD1, ..., VDM is envisaged.

Each of the elements $e1, \ldots, eN$ of an extracted vector contains a vectorial sample of the colour of at least one pixel $p1, \ldots, pK$ of a respective digital image $I1, \ldots, IK$ of the stream of digital images $I1, \ldots IK$. N is an integer number greater than 1 and preferably at least equal to double K (which represents the number of digital images of the video stream).

According to one embodiment, each of the elements $e1, \ldots, eN$ comprises a vectorial sample which as regards information represents the complete co-ordinates of the aforementioned at least one pixel in a predefined colour space. For example, each of the elements $e1, \ldots, eN$ comprises a sample composed of three digital values which represents an RGB colour set.

Wishing to give a clear, non-limiting example, hypothesising that each element $e1, \ldots, eN$ of the vectors $IV\_1, \ldots, IV\_M$ extracted in the step 104 comprises a vectorial sample relative to the set RGB of a single pixel, the element $e1$ of the vector $IV\_1$ will comprise the set RGB of the pixel $p1$ of the image $I1$ of the video content VD1, the element $e2$ of the vector $IV\_1$ will comprise the set RGB of the pixel $p2$ of the image $I2$ of the video content VD1, etc. Similarly, the element $e1$ of the vector $IV\_2$ will comprise the set RGB of the pixel $p1$ of the image $I1$ of the video content VD2, the element $e2$ of the vector $IV\_2$ will comprise the set RGB of the pixel $p2$ of the image $I2$ of the video content VD2, etc. According to one embodiment, the co-ordinates $p1, p2$ are the same for all the images and for all the video contents, in other words, the extraction of the step 104 is performed in relation to at least one pixel in a fixed position of the digital images of the plurality of video streams.

In a further embodiment, instead of a single pixel for each image vectors $IV\_1, \ldots IV\_M$ may be extracted the elements of which are samples containing colour information relative to a group of spatially adjacent pixels so as to obtain for the group of pixels a single vectorial sample (for example by averaging the values of the pixels of the group with simple or weighted average). Such vectorial sample bears information representing a chromatic co-ordinate of the group of pixels in a predefined chromatic space.

According to one embodiment, which will be called "off-line extraction mode", the aforesaid step of extracting 104 is performed off-line by software starting directly from files corresponding to the video contents VD1, ..., VDM. For example, this may be performed remotely all in one go, for example, at the server 10 and it may, for example, be envisaged that the set of vectors extracted be sent by telematic means to the acquisition and processing unit 3.

In an alternative embodiment which will be called "on-line extraction mode", it is possible to envisage 12 that the step of extracting 104 is performed in an initial training operation directly by the acquisition and processing unit 3 on the basis of the data acquired by the optical sensor 2 and processed by the acquisition and processing unit 3.

With reference to FIG. 2, the monitoring method 100 comprises a step of memorising 105, for example in the memory 5 of the acquisition and processing unit 3, for each video content VD1, ..., VDM the respective vector $IV\_1, \ldots, IV\_M$ extracted in the previous step of extracting 104. A database is thus obtained of a plurality of vectors $IV\_1, \ldots, IV\_M$ each of which univocally identifies a respective video content VD1, ..., VDM. In practice, each of said vectors extracted $IV\_1, \ldots, IV\_M$ represents a chromatic signature of the respective video content corresponding to the temporal sequence of the images or frames of said video content. For such reason such signature is the equivalent of or may be defined as a signature representative of the chromatic temporal evolution of a spatial area defined and limited by the stream of images which together constitute the video content.

The aforementioned steps of extracting 104 and memorising 105 may be performed one time only or at sporadic intervals. For example, such steps are sporadically performed when an update of the set of video contents becomes necessary. For the purposes of the present description, "sporadically" shall be understood to mean that such steps are performed at a frequency much lower than that of the displaying of the video contents. Conversely, steps 106 to 109 represented in the diagram of FIG. 2 show an outright monitoring procedure to be enacted in real time with the displaying of the video contents.

In greater detail, the monitoring method 100 comprises a step of displaying 106 (VD_PLAY) a video content VD1, ..., VDM by means of the display 1 and a step of acquiring 107 AV_GET, during the displaying step 106, a vector of N elements by means of the optical sensor 2 in a condition in which such sensor has its sensitive area facing the display 1 at the at least one pixel $p1, \ldots, pK$ in relation to which the extracting step 104 was performed. Each element of the vector acquired in the step 107 contains a vectorial sample of colour acquired from a respective digital image of the stream of digital images $I1, \ldots, IK$ of the video displayed.

According to one embodiment, the acquisition step 107 is performed at a sampling frequency equal to at least double the number of frames per second of the videos VD1, ..., VDM which are to be displayed on the display 1.

The monitoring method 100 further comprises a step 108 of comparing (VV_COMP) the vector acquired with the plurality of vectors extracted and memorised (IV_1, ..., IV_M).

The monitoring method 100 further comprises a step of identifying 109 (VV_ID) the video content VD1, ..., VDM displayed on the basis of the results of the comparison step 108.

According to one embodiment, the aforementioned step of identifying 109 comprises a step of verifying whether, on the basis of the result of the comparison, the vector acquired satisfies or not a criteria of similitude or equality with one of the vectors extracted and memorised IV_1, ..., IV_M. For example, in a currently preferred embodiment, the step of identifying 109, comprises an operation of calculating a cross-correlation method between the vector acquired and each of the vectors extracted and memorised IV_1, ..., IV_M. In such case the step of identifying 109 is such as to identify the video displayed in the display 1 as that corresponding to the vector extracted and memorised which maximises the result of cross correlation and/or which produces a result of cross correlation above a predefined limit value.

Again with reference to FIG. 2 as indicated by the arrow 101, the steps 106 to 109 described above may be performed in sequence for each video content to be displayed.

According to one embodiment, which proves particularly convenient to implement in the embodiment in off-line mode described above, the monitoring method 100 comprises a preliminary step of automatic calibration 103 (AUTO_CAL) for the recognition of the positioning co-ordinates of the sensitive area of the optical sensor 2 in relation to the active area of the display 1. In particular, according to one embodiment, the preliminary step of automatic calibration 103 comprises an operation of driving the display 1 so as to show thereon a calibration video having a stream of images with a background of a uniform colour and so as to modify over time selected spatial portions 11, 12 of the images of the calibration video making the aforesaid spatial portions 11, 12 assume a different colour from the background. In this case it is possible to process the data acquired by the acquisition and processing unit 3 by means of the optical sensor 2 so as to detect said modifications to identify the position of the sensitive area of the optical sensor 2. With reference to FIG. 4, according to one embodiment, it is possible to envisage that the aforesaid portions 11, 12 are vertical and horizontal strips which scan, as indicated by the arrows F1 and F2, the entire active area of the display 1 so as to permit the acquisition and processing unit 3 to identify the position of the sensitive area of the optical sensor 2. For example, according to one embodiment, the background colour is black, while the different colour is white, or vice versa. In this embodiment, if a strip, for example the vertical strip 11, is positioned outside the sensitive area of the optical sensor 2 the latter will detect, in the case of RGB space digitalised in 8 bit, a circuit (0,0,0) corresponding to the black background, while when the strip begins to cross the sensitive area of the colour sensor over time an uphill ramp will be detected as far as the circuit (255,255,255) corresponding to the white strip.

It is evident that the description of the aforesaid monitoring method 100 corresponds to the description of an IT product comprising code instructions loadable in a programme memory and suitable for being run by a processor so as to perform the aforesaid monitoring method 100.

Again with reference to FIG. 2 it may furthermore be envisaged that the monitoring method 100 comprises a step 102 (RES_DET) of determining the spatial resolution of the display 1. Such embodiment which proves particularly convenient in the so-called off-line mode embodiment of the monitoring method 100, makes it possible to appropriately scale the resolution of the video contents in their displaying on the display 1 so as to find the correct spatial correspondence between the acquisition position of the optical sensor 2 and the position of the at least one pixel for which the extraction step 104 of the vectors IV_1, ..., IV_M has been performed.

It is evident furthermore that the description of the aforesaid monitoring method 100 corresponds to the description of a hardware and software monitoring system 2, 3, adapted to monitor the displaying on a display 1 of a plurality of video contents VD1, ..., VDM each comprising a stream of digital images I1, ..., IK each digital image comprising a respective pixel matrix, the monitoring system 2, 3 comprising:

a memory 5 allocated for the memorisation, for each video content VD1, ..., VDM, of a respective vector IV_1, ..., IV_M having an integer number N of elements e1, ..., eN, each element containing vectorial samples of the colour of at least one pixel p1, ..., pK of a respective image of the sequence of digital images an optical sensor 2 having a sensitive area and configured to be coupled to the display 1 so that the sensitive area is facing the display 1 at the at least one pixel;

an acquisition and processing unit 3 operatively connected to the optical sensor 2 and configured to acquire, during the displaying of a video on the display 1, a vector of N elements, each element of the vector acquired containing vectorial colour information acquired from a respective digital image of the stream of digital images of the video displayed, the acquisition and processing unit 3 being further configured to compare the vector acquired with the plurality of vectors extracted IV_1, ..., IV_M so as to identify the video displayed VD1, ..., VDM.

Further characteristics of the aforesaid monitoring system 2, 3 may be inferred directly from the detailed description made with reference to the monitoring method in FIG. 2.

As is clear from the above description the predefined objectives may be fully achieved by a monitoring method and system of the type described above. From the description above, it is in fact clear that the proof of display based on temporal chromatic variations present in each video content VD1, ... VDM is particularly convenient and flexible in that it does not require the insertion of dedicated markers inside the video stream of video or multimedia content to be displayed on the display 1.

In addition, according to a further embodiment, it is possible to envisage that the optical sensor 2 is part of a device fitted with micro camera having an active area opposite the sensitive area of the optical sensor 2. This way it is possible by means of known recognition algorithms to perform and estimate and keep track of the number of people viewing the displaying and if necessary to turn off the display 1 should such number fall close to or equal to zero.

Obviously, a person skilled in the art may make numerous modifications and variations to the monitoring system and method described above so as to satisfy contingent and specific requirements, while remaining within the sphere of protection of the invention, as defined by the following claims.

For example, in one embodiment variation, it is possible to envisage that there are several optical sensors 2 so as to perform the aforesaid monitoring in parallel on several areas of the display 1.

The invention claimed is:

1. A method for monitoring a plurality of video contents shown in a display, each of the video contents comprising a stream of digital images, each of the digital images comprising a matrix of pixels, the method comprising:
   performing a preliminary automatic calibration to recognize positioning coordinates for a sensitive area of an optical sensor relative to the display;
      extracting, from each of the video contents, a vector having an integer number N of elements, each of the elements in the vector having a vectorial sample of color of at least one pixel of a respective one of the of digital images, wherein extraction of the vector is performed off-line via software, starting directly from a plurality of files corresponding to the plurality of video contents;
   storing, for each of the plurality of video contents, the vector extracted from each of the video contents in memory, thereby obtaining a plurality of vectors, each of the vectors uniquely identifying a corresponding one of the video contents;
   displaying a video content in the display;
   acquiring, while displaying the video content in the display, a vector of N elements using the optical sensor, the optical sensor comprising the sensitive area facing the display at the at least one pixel in accordance with the positioning coordinates for a sensitive area, each element of the vector acquired containing vectorial color information acquired from a respective digital image of the stream of digital images of the video content displayed;
   comparing the vector acquired with the plurality of vectors extracted and stored in the memory; and
   identifying the video content shown in the display.

2. The method according to claim 1, wherein each of the elements in the vector comprises complete coordinates of the at least one pixel in a predefined color space.

3. The method according to claim 2, wherein each of the elements in the vector comprises three digital values which represent a color set.

4. The method according to claim 1, wherein identifying the video content show in the display comprises:
   obtaining a result by comparing the vector acquired with the plurality of vectors extracted and stored in the memory; and
   verifying, based on the result, whether the vector acquired satisfies a criteria of similitude or equality with one of the vectors extracted.

5. The method according to claim 4, wherein comparing the vector acquired with the plurality of vectors extracted and stored in the memory comprises performing a cross-correlation between the vector acquired and each of the vectors extracted; and
   wherein identifying the video content shown in the display comprises maximizing a result of cross correlation or producing the result of cross correlation is greater than a predefined limit value.

6. The method according to claim 1, wherein the at least one pixel comprises a group of adjacent pixels.

7. The method according to claim 1, wherein performing the preliminary automatic calibration further comprises driving the display to show thereon an image with a background of a uniform color and to modify selected spatial portions of the image making the spatial portions assume a different color from the background color and to process data acquired by the optical sensor to detect the modified selected spatial portions.

8. The method according to claim 7, wherein the background color and the different color are black and white or vice versa.

9. The method according to claim 1, wherein the vector is extracted in an initial training operation based on of data acquired said by the optical sensor.

10. The method according to claim 1, wherein the plurality of video contents are without dedicated markers adapted for permitting proof of display.

11. A monitoring system, comprising hardware and software adapted to monitor a plurality of video contents shown on a display, each of the video contents comprising a stream of digital images, each of the digital images in the stream comprising a pixel matrix, the monitoring system comprising:
   a memory allocated for storing, for each of the video contents, a vector having an integer number N of elements, each of the elements containing vectorial samples of a color of at least one pixel of a respective one of the images of the stream of digital images, thereby obtaining a plurality of vectors, wherein extraction of the vector is performed off-line via software, starting directly from a plurality of files corresponding to the plurality of video contents;
   an optical sensor having a sensitive area, the optical sensor configured to be coupled to the display so that the sensitive area is facing the display at the at least one pixel;
   an acquisition and processing unit operatively connected to the optical sensor, and configured to:
      perform an automatic calibration to recognize positioning coordinates for the sensitive area of the optical sensor in relation to the display;
      acquire, while a video content is shown in the display, a vector of N elements, each of the elements of the vector acquired containing a sample of color acquired from a respective digital image of the stream of digital images of the video shown in the display; and
      compare the vector acquired with the plurality of vectors extracted and stored in the memory to identify the video content shown in the display.

12. The system according to claim 11, wherein each of the elements in the vector comprises complete coordinates of the at least one pixel in a predefined color space.

13. The system according to claim 12, wherein each of the elements in the vector comprises three digital values which represent a color set.

14. The system according to claim 11, wherein the at least one pixel comprises a group of adjacent pixels.

15. The system according to claim 11, wherein performing the automatic calibration further comprises driving the display to show thereon an image with a background of a uniform color and to modify selected spatial portions of the image making the spatial portions assume a different color from the background color and to process data acquired by the optical sensor to detect the modified selected spatial portions.

16. The system according to claim 15, wherein the background color and the different color are black and white or vice versa.

17. The system according to claim 11, wherein the vector is extracted in an initial training operation based on data acquired by the optical sensor.

18. The system according to claim 11, wherein the plurality of video contents are without dedicated markers adapted for permitting proof of display.

19. A non-transitory computer-readable medium embodying program code to monitor a plurality of video contents shown in a display, each of the video contents comprising a stream of digital images, each of the digital images comprising a matrix of pixels, the program code executable in at least one computing device that, when executed by the at least one computing device, causes the at least one computing device to:

perform a preliminary automatic calibration to recognize positioning coordinates for a sensitive area of an optical sensor relative to the display;

extract, from each of the video contents, a vector having an integer number N of elements, each of the elements in the vector having a vectorial sample of color of at least one pixel of a respective one of the digital images, wherein extraction of the vector is performed off-line via software, starting directly from a plurality of files corresponding to the plurality of video contents;

store, for each of the video contents, the vector extracted from each of the plurality of video contents in memory, thereby obtaining a plurality of vectors, each of the vectors uniquely identifying a corresponding one of the video contents;

display a video content in the display;

acquire, while the video content is shown in the display, a vector of N elements using the optical sensor, the optical sensor comprising the sensitive area facing the display at the at least one pixel in accordance with the positioning coordinates for a sensitive area, each of the elements of the vector acquired containing vectorial color information acquired from a respective digital image of the stream of digital images of the video content shown in the display;

compare the vector acquired with the plurality of vectors extracted and stored in the memory; and identify the video content shown in the display.

\* \* \* \* \*